United States Patent [19]

Bendickson et al.

[11] Patent Number: 4,947,553
[45] Date of Patent: Aug. 14, 1990

[54] SNIPS HAVING BUTTON LOCKING MECHANISM

[75] Inventors: Roy B. Bendickson, Merrill; Robert A. Seaton, Wausau, both of Wis.

[73] Assignee: Fiskars Oy Ab, Helsinki, Finland

[21] Appl. No.: 271,201

[22] Filed: Nov. 14, 1988

Related U.S. Application Data

[63] Continuation-in-part of Ser. No. 227,982, Aug. 3, 1988, Pat. No. D. 305,090.

[51] Int. Cl.$^5$ ............................................. B26B 13/00
[52] U.S. Cl. ........................................ 30/262; 30/193
[58] Field of Search ................ 30/191, 193, 262, 254, 30/261

[56] References Cited

U.S. PATENT DOCUMENTS

| | | | |
|---|---|---|---|
| 309,889 | 12/1884 | Shepard | 30/262 |
| 2,965,967 | 12/1960 | Wahl | 30/254 UX |
| 3,357,287 | 12/1967 | Wertepny | 30/262 |
| 4,073,059 | 2/1978 | Wallace et al. | 30/261 |
| 4,156,311 | 5/1979 | Wallace et al. | 30/262 |
| 4,258,472 | 3/1981 | Wallace et al. | 30/262 |
| 4,567,656 | 2/1986 | Wallace et al. | 30/262 |

OTHER PUBLICATIONS

Photocopy of photograph of "Shear Magic" Snips.
Photocopy of photograph of "Kamaki" Snips.
Photocopy of photograph of "Florian" Snips.
Photocopy of photograph of "Prunette" Snips.

*Primary Examiner*—Douglas D. Watts
*Attorney, Agent, or Firm*—Foley & Lardner

[57] ABSTRACT

A hand tool according to the invention, such as a pair of snips, has a releasable locking mechanism whereby the jaws of the tool can be secured in a closed position. The locking mechanism includes a pair of projections disposed in offset, opposing positions on the handles of the tool. The projections have respective holes which are brought into alignment when the tool handles are brought together to close the jaws. A suitable mechanism, such as a rectactable button, engages both holes and holds the handles together against the force of a spring which biases the jaws towards an open position. The locking mechanism can include a groove-and-projection detent mechanism which allows the jaws to be unlocked by simply squeezing the handles.

8 Claims, 2 Drawing Sheets

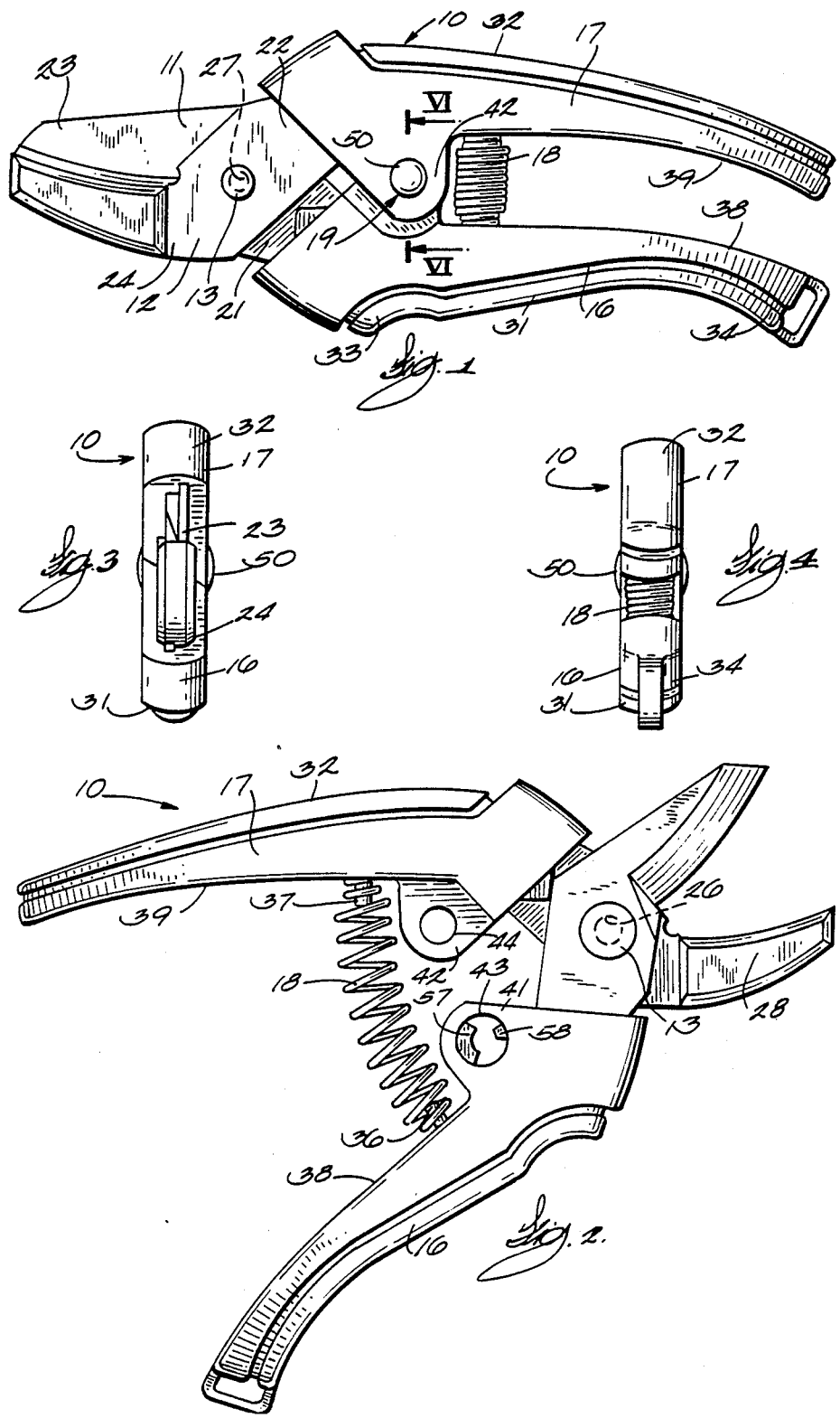

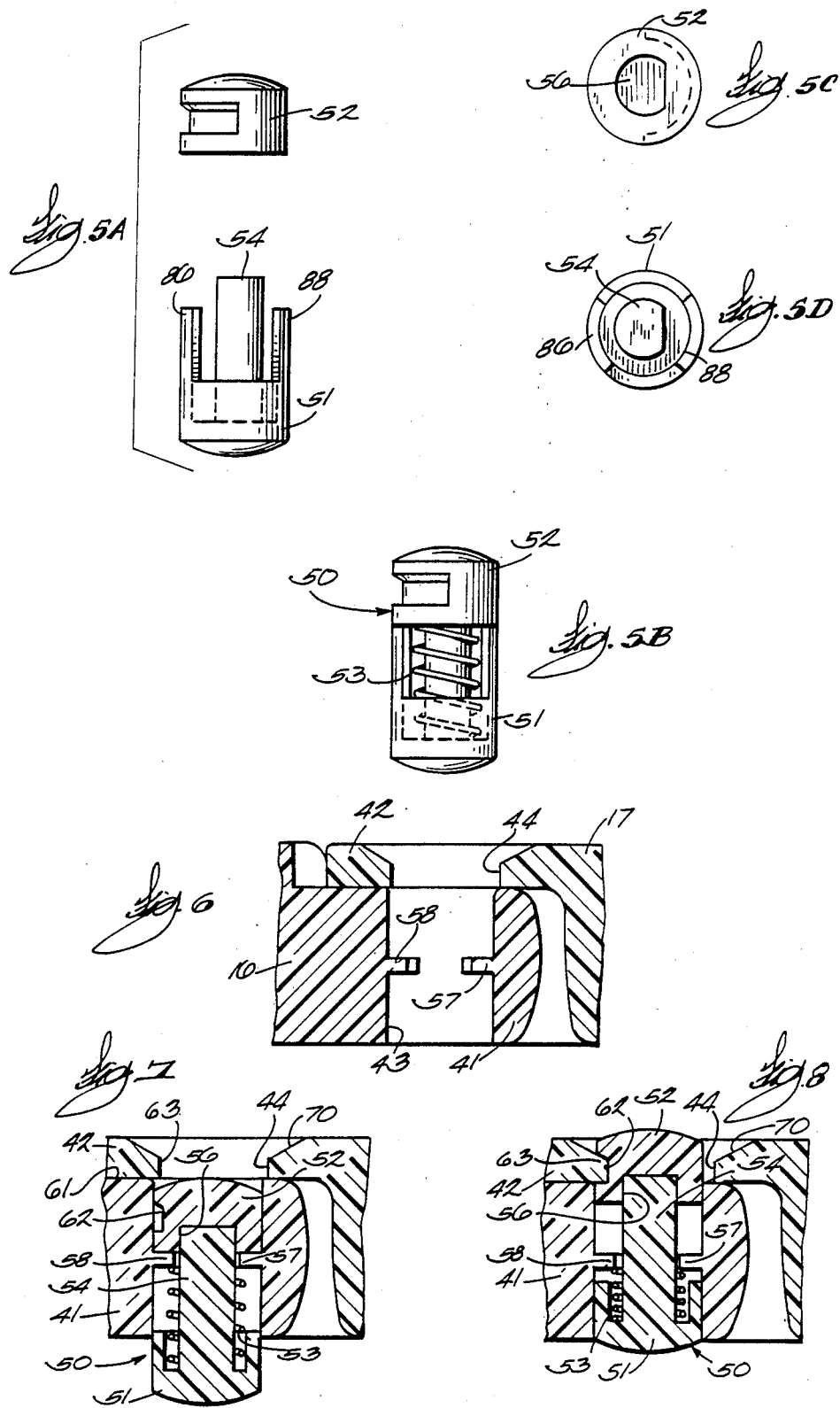

SNIPS HAVING BUTTON LOCKING MECHANISM

This application is a continuation-in-part of U.S. Ser. No. 227,982, entitled "HANDLES FOR PRUNER SNIPS", filed Aug. 3, 1988, now U.S. Pat. No. DES. 305,090.

TECHNICAL FIELD

The present invention relates, generally, to hand-held pruner snips for cutting, clipping and pruning, and, more particularly, to pruner snips having an improved handle contour and an integral spring loaded buttom locking mechanism.

DESCRIPTION OF BACKGROUND ART AND TECHNICAL PROBLEMS

It is generally known to provide hand-held garden shears, wire snips, pliers, and various other cutting instruments having a spring mechanism for urging the handles in the "open" position, thereby exposing the jaws or cutters. To reduce the likelihood of inadvertent cutting or injury, a locking mechanism is often provided for maintaining the cutter in the closed position when the device is not in use.

Presently, hand held cutters are locked in the closed position by, for example, a pivoting member secured to one of the cutting jaws which may be pivoted into abutting relationship with the opposing jaw. Other devices employ a pivoting ratchet mechanism which can be moved from a locked to an unlocked position by the user's thumb. Presently available devices require the use of both of the operators hands to manipulate the locking mechanism, or, alternatively, require use of the operator's thumb, which can be awkward and inconvenient.

SUMMARY OF THE INVENTION

The present invention provides pruner snips having a pair of jaws, pivotally secured to each other for effecting scissor movement, and a pair of handles for actuating the jaws, the apparatus being resiliently biased in the open position. The handles have offset, inwardly directed projections with holes therethrough, the projections being configured such that the holes become aligned when the jaws are in the closed position. A spring biased locking mechanism is disposed for engagement in the holes to releasably maintain the jaws in the closed position.

BRIEF DESCRIPTION OF THE DRAWING

FIG. 1 is a left side elevational view of the snips in accordance with one aspect of the present invention, shown in the closed position;

FIG. 2 is a right side elevational view of the snips of FIG. 1, shown in the open position;

FIG. 3 is a front end elevational view of the snips of FIG. 1;

FIG. 4 is a rear end elevational view of the snips of FIG. 3;

FIG. 5A is an exploded elevational view of the button locking mechanism according to the invention;

FIG. 5B is an elevational view of the button locking mechanism in the assembled position;

FIG. 5C is a bottom plan view of the upper button section shown in FIG. 5A;

FIG. 5D is a top plan view of the lower button section shown in FIG. 5A;

FIG. 6 is a partial sectional view taken along the line VI—VI in FIG. 1;

FIG. 7 is a partial sectional view of the handle projections of FIG. 6, shown with the button locking mechanism of FIG. 5B installed therein in the unlocked position; and FIG. 8 is a partial sectional view of the handles and button mechanism of FIG. 7 shown in the locked position.

DETAILED DESCRIPTION OF A PREFERRED EXEMPLARY EMBODIMENT

Referring to FIGS. 1 and 2, a pair of snips 10 according to the invention includes a pair of cutting jaw members 11, 12 secured for relative pivotal movement about a pivot fastener (bolt) 13, a pair of respective handles 16, 17, suitable means for urging handles 16, 17 apart, such as a compression spring 18, and a locking mechanism 19. Handles 16, 17 are made of hard, molded plastic in which respective tangs 21, 22 of jaw members 11, 12 are embedded. Locking mechanism 19 serves to secure snips 10 in a closed position, as described hereafter.

Referring now to FIGS. 1–4, jaw members 11 and 12 are flat, elongated, unitary pieces of steel. Jaw members 11, 12 each include respective blade portions 23, 24 disposed for scissor movement relative to each other, alinged holes 26, 27 in which bolt 13 is secured, and tangs 21, 22 on the opposite side of holes 26, 27 from blades 23, 24. Blade 24 may, if desired, be covered by a plastic sheath 28.

Plastic handles 16, 17 are configured to provide the user with a secure grip on snips 10. Respective outer faces 31, 32 of handles 16, 17 may have generally convex surfaces, i.e., surfaces which are rounded relative to the circumferential direction of handles 16, 17. Handles 16 and 17 curve arcuately in a common direction. Handle 16 additionally includes a saddle-shaped indentation 33 proximate the front end thereof for receiving the user's forefinger and an outwardly turned end portion 34 which provides an improved grip for the third and fourth fingers, and prevents the user's fingers from slipping off the handle. Handle 17 curves toward handle 16 and rests against the ball of the user's thumb.

Handles 16, 17 include a pair of opposing projections (posts) 36, 37 disposed on inner faces 38, 39 thereof on which opposite ends of compression spring 18 are mounted. Spring 18 biases snips 10 to an open position. Locking mechanism 19 allows snips 10 to be releasably secured in a closed position against the force of spring 18. For this purpose, locking mechanism 19 includes a pair of offset projections 41, 42 of handles 16, 17. Projections 41, 42 have holes 43, 44 of the same diameter extending therethrough. Projections 41, 42 extend inwardly in opposing positions so that holes 43, 44 are aligned with each other when snips 10 are in the closed position shown in FIG. 1. Projection 41 of handle 16 has a greater thickness than projection 42, and is thus configured to receive a locking button mechanism 50 therein.

Referring to FIGS. 5A–5D and 6–8, button mechanism 50 includes a pair of generally cylindrical plastic button sections 51, 52 and a compression spring 53. Button section 51 has a central pin 54 which is press-fitted into a corresponding recess 56 of button section 52, and a pair of arcuate extensions 86 and 88 which extend in the same direction as pin 54 but are located at the periphery of button section 51, as shown in FIG. 5A. Hole 43 has a pair of opposed, radially inwardly extending retaining flanges 57, 58 between which pin 54 extends. Spring 53 resiliently engages flanges 57, 58 and the inner end of button section 51 so that button mechanism 50 is biased to an outwardly projected position at which button 50 is disposed at or beneath the level of inner face 61 of projection 41. Button mechanism 50 thereby does not interfere with bringing snips 10 to a completely closed position.

Once snips 10 are brought to a closed position, button mechanism 50 may be resiliently urged into hole 44. Button section 52 has a circumferential groove 62 therein which is engaged by a suitable projection, for example, an inner annular wall 63 of hole 44 as handles 16, 17 are released slightly from a closed, unlocked position. In this manner, groove 62 and annular wall 63 function as a detent to releasably secure snips 10 in the closed position. When the user releases handles 16, 17, the force of spring 18 holds wall 63 in engagement with groove 62, preventing retraction of button 50 due to the force of spring 53 (see FIG. 8). To release snips 10, the user squeezes handles 16, 17 together slightly, so that wall 63 clears groove 62, and button 50 immediately returns to its initial, retracted position (FIG. 7) through the force exerted on button section 51 by spring 53. To facilitate engagement with groove 62, hole 44 may have an outwardly opening annular recess 70 therein which adjoins inner wall 63.

It will be understood that the foregoing description of a preferred exemplary embodiment of the present invention and the invention is not limited to the specific form shown. Various modifications may be made in the design and construction of the components without departing from the spirit of the invention as specified in the appended claims.

What is claimed is:

1. A hand tool, comprising:
   a pair of jaws;
   a pivot uniting said jaws for scissor movement about said pivot;
   a pair of handles for actuating said jaws;
   means for resiliently biasing said jaws to an open position; and
   a releasable locking mechanism for securing said jaws in a closed position, including a pair of offset, inwardly directed, first and second projections on said handles having respective first and second holes therethrough configured to become coaxially aligned with each other when said jaws assume a closed position, and means disposable in said holes for holding said jaws in a closed position against the force of said jaw biasing means,
   wherein said holding means comprises a button mechanism disposed in said first hole for movement in a direction transverse to said scissor movement, said first projection having a radially inwardly extending flange disposed in said first hole thereof on which said button mechanism is movably mounted, and wherein said first projection further comprises means, which coacts with said flange, for substantially preventing rotation of said button mechanism within said first hole.

2. The hand tool of claim 1, wherein said button mechanism includes a pair of first and second button sections, means for securing said button sections on opposite sides of said flange, and means for biasing said button mechanism to a retracted position in which said second button section, which is disposed proximate said second hole when said first and second holes are aligned, is withdrawn substantially entirely within said first hole.

3. The hand tool of claim 2, further comprising detent means for releasably retaining said button mechanism in a protracted position wherein said second button section is disposed in said second hole against the force of said button mechanism biasing means.

4. The hand tool of claim 2, wherein said button mechanism biasing means comprises a compression spring disposed within said first button section and having a first end resiliently biased against said flange and a second end resiliently biased against an inner end wall of said first button section.

5. A hand tool, comprising:
   a pair of jaws;
   a pivot uniting said jaws for scissor movement about said pivot;
   a pair of handles for actuating said jaws;
   means for resiliently biasing said jaws to an open position; and
   a releasable locking mechanism for securing said jaws in a closed position, including a pair of offset inwardly directed, first and second projections on said handles having respective first and second holes therethrough configured to become coaxially aligned with each other when said jaws assume a closed position, and a button disposed in said first hole for movement in a direction transverse to said scissor movement and being configured to hold said jaws in a closed position against the force of said jaw biasing means, said first projection having a radially inwardly extending flange disposed in said first hole thereof on which said button mechanism is movably mounted;
   said button mechanism further including a pair of first and second button sections, means for securing said button sections on opposite sides of said flange, and means for biasing said button mechanism to a retracted position in which said second button section, which is disposed proximate said second hole when said first and second holes are aligned, is withdrawn substantially entirely within said first hole; and
   detent means, comprising a groove and a projection configured for mating engagement with said groove, for releasably retaining said button mechanism in a protracted position wherein said second button section is disposed in said second hole against the force of said button mechanism biasing means, one of said projection and said groove being disposed on the outer surface of said second button section, and the other thereof being disposed in an inner annular wall of said second hole.

6. A locking mechanism for securing a pair of movable members together, comprising:
   a pair of first and second projections disposed on each of said members, said projections having respective first and second holes therethrough configured to become coaxially aligned with each other when said members are brought together, and said first projection having a radially inwardly extending flange disposed in said first hole;
   a button mechanism mounted on said flange and disposed in said first hole for movement between a retracted position and a protracted position, said button mechanism including a pair of first and second button sections, means for securing said button sections on opposite sides of said flange, and a compression spring, disposed within said first button section confined between said flange and an inner end wall of said first button section, said compression spring being configured to bias said button mechanism into said retracted position in which said second button section, which is disposed proximate said second hole when said first and second holes are aligned, is withdrawn substantially entirely within said first hole; and detent means, including a groove and a projection configured for mating engagement with said groove, for releasably retaining said button mechanism is said protracted position wherein said second button section is disposed in said second hole against the force of said compression spring, wherein one of said projection and said groove is disposed on the outer surface of said second button section, and the other thereof is disposed on an inner wall of said second hole.

7. A locking mechanism for securing a pair of movable members together, comprising:

a pair of first and second projections disposed on each of said members said projections having respective first and second holes therethrough configured to become coaxially aligned with each other when said handles are brought together, and said first projection having a radially inwardly extending flange disposed in said first hole;

a button mechanism mounted on said flange and disposed in said first hole for movement between a retracted position and a protracted position, said button mechanism including a pair of first and second button sections, means for securing said button sections on opposite sides of said flange, and means for biasing said button mechanism to said retracted position in which said second button section, which is disposed proximate said second hole when said first and second holes are aligned, is withdrawn substantially entirely within said first hole;

detent means for releasably retaining said button mechanism in said protracted position wherein said second button section is disposed in said second hole against the force of said button mechanism biasing means;

wherein one of said button sections has an elongated pin which extends past said flange and is press-fitted into a corresponding recess in the other of said button sections; and said one button section has a spacing projection shorter than said pin and extending in parallel with said pin, which spacing projection engages the other button section.

8. The hand tool of claim 1, wherein said first projection further comprises a pair of mutually opposed, inwardly directed flanges disposed in said first hole.

* * * * *